UNITED STATES PATENT OFFICE.

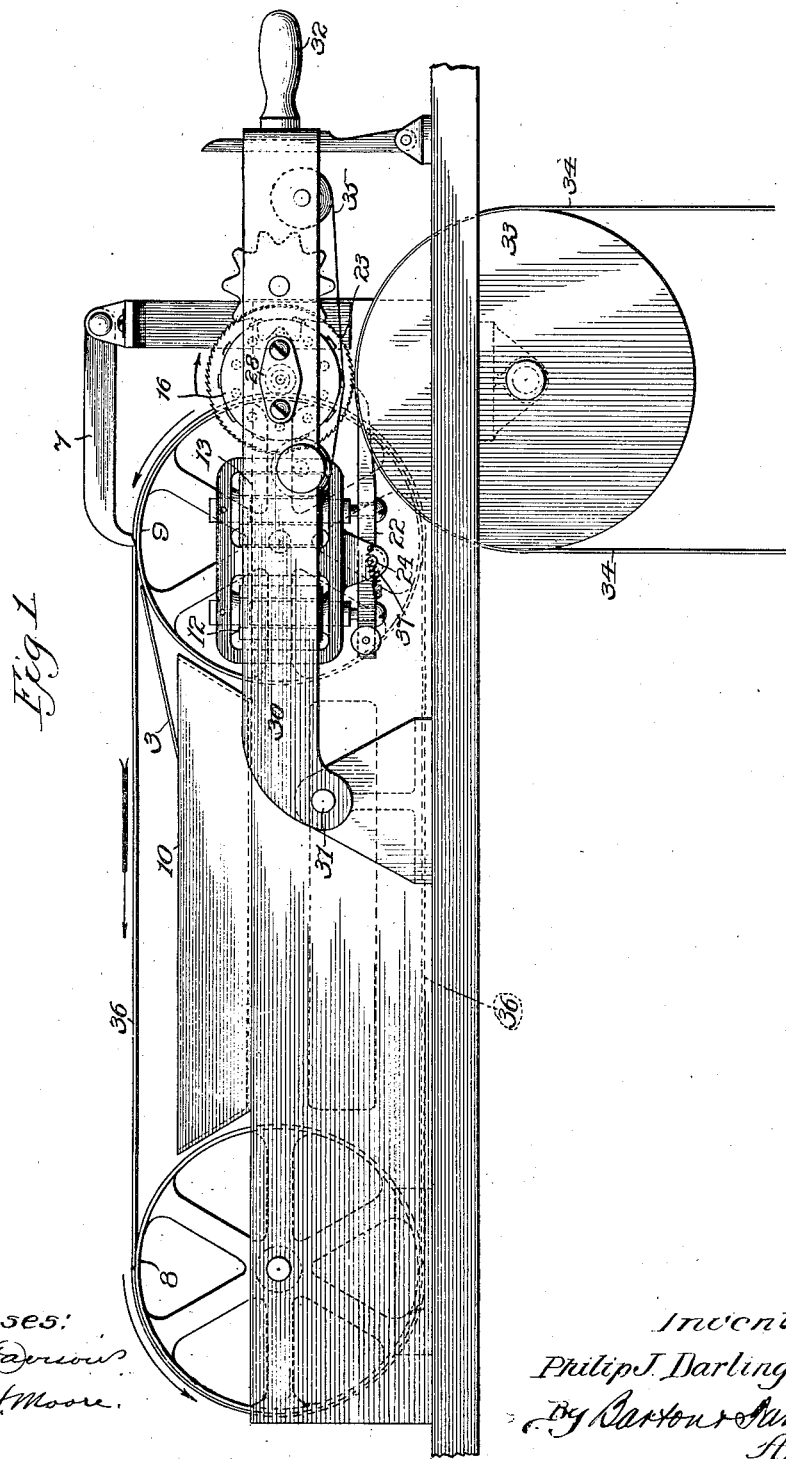
No. 834,365.  
P. J. DARLINGTON.  
INTEGRATING MACHINE.  
APPLICATION FILED OCT. 30, 1905.
PATENTED OCT. 30, 1906.
2 SHEETS—SHEET 1.
Witnesses:
Inventor:  
Philip J. Darlington  
by Barton & Tanner  
Attys.

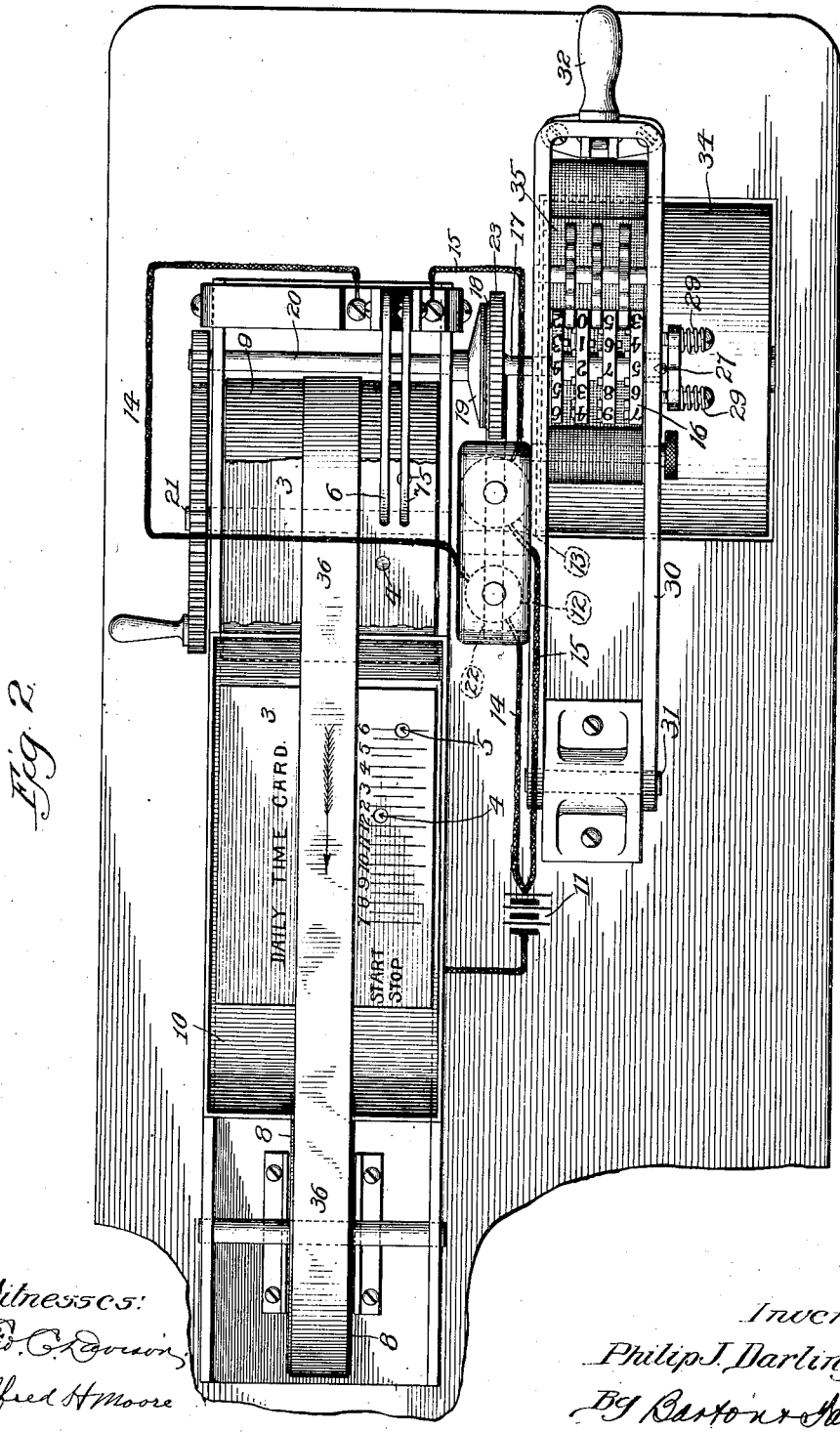

PHILIP J. DARLINGTON, OF HINSDALE, ILLINOIS.

INTEGRATING-MACHINE.

No. 834,365.   Specification of Letters Patent.   Patented Oct. 30, 1906.

Application filed October 30, 1905. Serial No. 285,020.

*To all whom it may concern:*

Be it known that I, PHILIP J. DARLINGTON, a citizen of the United States, residing at Hinsdale, in the county of Dupage and State of Illinois, have invented a certain new and useful Improvement in Integrating-Machines, of which the following is a full, clear, concise, and exact description.

My invention relates to a system of record-keeping in which quantities or amounts are recorded by distances measured between terminal points on a record-blank and to a machine for automatically integrating, adding, and recording in figures the amounts thus shown by a number of records.

While my invention will be useful for various purposes, it has been designed particularly to aid in computing shop costs or workmen's wages upon the basis of time spent. In another application, Serial No. 285,021, filed October 30, 1905, I have described an improved time-recorder by which elapsed time is indicated upon a record card or blank by the distance between two marks, one of which indicates the time of starting and the other the time of stopping work. By means of my present invention the amounts of time (or any other quantities capable of similar indication) shown by a number of such record-blanks may be easily and quickly integrated or reduced to figures, added, and the sum totals indicated and recorded. Such a system will be especially valuable for quickly and accurately computing the entire time spent upon a particular piece of work or by a particular workman, and the corresponding shop cost or wages due, from a number of separate time-cards showing the individual amounts.

I will describe my invention particularly by reference to the accompanying drawings, illustrating the preferred form of machine, in which—

Figure 1 is a plan view, and Fig. 2 a side elevation.

The same figures of reference indicate the same parts wherever shown.

The form of machine illustrated is adapted to receive individual record-cards 3, each of which bears an indication of a particular amount or quantity. These cards are intended to be fed through the machine one after another, and the machine is provided with integrating and adding mechanism which is controlled by the record-marks on said cards, and thereby actuated to perform the necessary calculations. In Fig. 2 one of the cards 3 is shown as having passed through the machine, and a portion of another card (the ends of which are broken away) is also shown in the act of passing through. Each card has two holes 4 5 punched therein, and it is the distance on the scale between these two holes which indicates the quantity (in this case elapsed time) to be integrated. These holes are offset with respect to each other, so as to follow different parallel paths as the card travels through the machine, and the two fingers 6 7 are provided upon the machine in such positions that as the card travels one of the holes therein will pass under one finger and the other hole under the other finger. Two drums 8 9 are provided at the ends of the machine, around which drums an endless belt 36 is passed. The cards are fed into the machine in position to rest upon the upper side of the lower lap of the belt and to be carried thereby around one of the drums, upon which the ends of the fingers 6 7 normally rest. After leaving said drum 9 the cards are discharged in a tray 10.

The drum 9 is metallic and forms one terminal of two branch electric circuits 14 15, the other terminals of which are formed by the ends of the fingers 6 7. Said fingers are pivoted upon the frame of the machine and insulated therefrom and from each other, and each card as it passes beneath said fingers is adapted to lift them from the drum to break the corresponding branch electric circuits. Said branch circuits are supplied with current from a battery 11 and include the energizing windings of solenoid-magnets 12 13, respectively.

As each card passes under the fingers 6 7, both fingers are raised from the drum, but as the card continues to travel the finger 6 drops through the hole 4 of the card (which is always in advance of the other hole 5) into contact with the drum 9, so that the branch circuit 14 containing magnet 12 is thereby closed. A further travel of the card brings the other hole 5 under the finger 7 to permit said finger in its turn to engage the drum and control the other branch circuit 15 containing the other magnet 13.

The successive actuations of the respective magnets 12 and 13 are thus brought about at intervals which bear a definite relation to the longitudinal distance between the holes in the card and may be caused to produce a corresponding actuation of an integrating, measuring, or counting apparatus, as follows: A counting train of wheels 16 of a type well known in the art is arranged to be advanced by the rotation of a spindle 17. Said spindle carries a friction-disk 18, adapted to be driven by a second friction-disk 19, which is carried by a shaft 20, the latter shaft being connected by intermediate gearing to the shaft 21 of the drum 9. Any rotation of said drum 9, as in feeding the cards, thus produces a corresponding or proportionate rotation of the shaft 20 and disk 19 and tends to transmit such corresponding or proportionate rotation to the disk 18 and spindle 17 of the counting-train. Said spindle 17, however, is normally held against rotation by a pawl 22, engaging a ratchet-wheel 23, carried by said spindle, so that normally the friction-disk 19 merely slips upon the disk 18 without transmitting motion thereto. The pawl 22 is pivoted at 24 and the end thereof is normally held in engagement with the ratchet-wheel 23; but the core of the solenoid-magnet 12 is connected with said pawl, so that said magnet when excited tends to rock the pawl out of engagement with said ratchet-wheel and permit the counting-train to be advanced. The core of the other solenoid-magnet 13 is also connected with said pawl upon the opposite side of the pivot 24 thereof, thus tending to oppose the effect of magnet 12 and keep the pawl in engagement with the ratchet-wheel to lock the counting-wheel against motion. The magnet 13 is adapted to overcome the effect of magnet 12, so that while both magnets are excited the effort exerted by magnet 13 will predominate, and the counting-train will thus be held locked. This may be accomplished by winding the coil of magnet 13 with a greater number of ampere-turns than the coil of magnet 12.

The pawl 22 is provided with a spring 37 for holding it in either position to which it may be tilted, so that when once moved by magnet 12 to release the counting-train it will thereafter be held in the "release" position until positively moved back to the locking position whether the magnet 12 remains excited or not. Similarly, when once tilted to the locking position by magnet 13 said pawl will be held therein until positively moved by the magnet 12.

As shown in the drawings, the spindle 17 of the counting-train is provided with a ball-bearing or pivot 27 at its end, a bearing-plate 28 therefor being pressed against the same by springs 29. The end pressure thus exerted upon the spindle tends to maintain the disk 18 pressed against the driving-disk 19, so as to be kept in operative relation thereto and to compensate for the wear on said disks.

The totals indicated by the counting-train may be printed upon a result-record by the following means: In the machine illustrated the counting-train is mounted upon a movable framework 30, which is pivoted at 31 and arranged to be rocked about its pivot by a handle 32. A record-drum 33 is mounted below the counting-train and carries the result-record sheet 34, which may be in the form of a tape passing around said drum. The wheels of the counting-train are type-wheels with raised figures, and an inked ribbon 35 is carried by rollers mounted in the swinging frame 30, said ribbon being interposed between the type-wheels of the counting-train and the record-tape. The total indicated at any time upon the counting-train may thus be printed upon the tape 34 by simply depressing the handle 32 to swing the frame 30 downward and press the type-wheels of the counting-train against the inked ribbon which marks the paper tape, the action being similar to a type-writer. Normally the swinging frame is held up to keep the type-wheel out of engagement with the tape 34 and the spindle 17 in alinement with the shaft 20 of the driving mechanism.

The operation of the machine is as follows: The drum 9 being started in rotation, the friction-disk 19 is driven and tends to drive the counting-train; but said counting-train is locked by the pawl 22 engaging the ratchet-wheel 23, because both contact-fingers 6 7 are in engagement with the drum 9 and both magnets 12 and 13 are excited, the effort of magnet 13 predominating. The cards 3, bearing the punched records to be integrated, are now fed upon the lower laps of the belt 36 and carried thereby around the drum 9. As the forward edge of the card passes under the fingers 6 7 said fingers are lifted, breaking both circuits 14 and 15, so that both magnets 12 and 13 are deënergized and the pawl 22 still remains in engagement with the ratchet to maintain the counting-train locked.

Now as the card continues its travel under the fingers 6 7 the hole 4 therein will be brought under the finger 6 and will permit said finger to fall into contact with the drum 9, thus closing circuit 14 and energizing the release-magnet 12. The circuit controlled by finger 7 through the retaining-magnet 13 being still open and said retaining-magnet unexcited, the pawl 22 will be tilted to release the ratchet-wheel and permit the counting-train to be driven by the friction-disk 19.

As the drum is now turned to advance the card, the counting-train will be driven through the agency of the friction-wheels 19 18, the advance of the counting-train being in a definite ratio to the advance of the card. This continues until the card has advanced far enough to bring the second hole 5 therein under the contact-finger 7, whereupon said finger, falling into contact with the drum 9, completes the circuit 15 through the retaining or locking magnet 13. Said magnet, being excited, acts to tilt the pawl 22 back into engagement with the ratchet-wheel 23, and thus to lock the counting-train against further advance. The amount which the counting-train has been advanced thus corresponds to the significant distance between the holes 4 and 5 in the record-card, whatever that distance may be.

As the card advances farther and the hole 5 passes beyond the end of the finger 7 the circuit 15 is again opened by said finger riding up on the card, but the pawl 22 is maintained in its locking position by the spring 37. Then, finally, as the card leaves both of the fingers 6 7 both circuits 14 15 are again closed to excite both magnets 12 and 13, and, the effort of magnet 13 predominating, the pawl 22 will still remain in its locking position to prevent advance of the counting-train.

The same operations take place for each card that passes through the machine, so that the total amount which the counting-train has advanced corresponds to the total of the distances 4 5, measured on all the cards. In other words, the counting-train integrates, adds, and indicates in figures the total of all the quantities represented by the records upon all the cards which have passed through the machine. This total may be indicated upon the record-tape 34 by depressing the handle 32 to cause an impression of the printing-wheels against the tape through the interposed inked ribbon. When a given lot of cards have been thus integrated and their records added and recorded, the wheels of the counting-train may be returned to zero by running the machine backward or manually turning the counting-wheels to prepare the machine for a fresh start on the next lot of cards.

Any multiplying factor, such as the rate per hour, can be introduced into the result by using a suitable ratio of gears between the drum-shaft 21 and the driving-disk 19 of the counting-train. The results may thus be made to show cost or wages in dollars and cents.

Where in the specification or claims mention is made of the distance between the holes or marks of the card, I refer not necessarily to the absolutely-straight-line distance from hole to hole, but rather to the distance which indicates the quantity—the distance longitudinally along the scale. In the card shown one of the holes is nearer to the edge of the card than the other; but it is obvious that the location of the hole may vary crosswise of the scale without varying the indication thereby given. The effective distance is that which is significant, the longitudinal distance along the scale between the points thereof indicated by the holes or other marks.

It will be understood that the invention herein described may be embodied in structures differing widely from the particular machine shown in the drawings, and I do not, therefore, desire to be understood as limiting myself to the precise form which has been chosen for the purposes of illustration; but

I claim—

1. The combination with a counting device and operating mechanism therefor, of a record having marks thereon, a pair of fingers sensitive to the marks on said record, means for causing relative movement of said record and fingers, means actuated by one of said fingers in response to one of said record-marks, for applying said operating mechanism to said counting device, and means actuated by said other finger in response to another of said marks, for stopping said counting device.

2. The combination with a record having two marks thereon, of a movable indicator, means for moving said card, and mechanism sensitive to the marks on said card and actuated by the movement thereof adapted to impart a movement to said indicator corresponding in extent to the significant distance between said marks.

3. The combination with a series of record-cards each having a quantity indicated thereon by the distance between two holes in such card, of a movable indicator, means for moving said card, means adapted when free to advance said indicator at a rate corresponding to the rate of movement of said card, a locking device for said indicator, and means governed by the holes in said card adapted to release said indicator during the movement of said card a distance corresponding to the distance between the holes therein.

4. The combination with a series of record-cards each having two holes therein whose distance apart indicates a quantity, of an integrating-machine, means for passing said cards through said machine, a counting-train for said machine, and mechanism governed by such holes in a card adapted during the passage of said card to advance said counting-train to an extent corresponding to the distance between said holes; whereby the counting-train is caused to indicate the sum of all the quantities indicated by all the individual cards that have passed through said machine.

5. The combination with a series of record-cards each having two marks thereon whose distance apart indicates a quantity, of a counting-train, a measuring mechanism governed by the successive marks on a card and means controlled by said measuring mechanism for correspondingly advancing said counting-train, whereby the quantities indicated by the several cards are automatically added and the totals indicated.

6. The combination with a counting-train, of a record having two marks thereon and means for moving said record, friction driving mechanism operated in moving said record adapted to correspondingly advance said counting-train, a lock for said counting-train and means controlled by the marks on said card adapted to release said counting-train during the passage of the portion of said card lying between said marks past a given point.

7. In an integrating-machine, the combination with a counting-train, of a releasing-magnet and a locking-magnet and corresponding means for controlling said counting-train, a circuit for each magnet, friction driving mechanism for operating said counting-train and contact devices controlling said magnet-circuits.

8. In an integrating-machine, the combination with a counting-train, of friction driving mechanism therefor, a record having marks thereon, a finger adapted to engage said record and sensitive to the marks thereon, means for producing relative movement of said record and said finger, and correspondingly actuating said friction driving mechanism, and locking mechanism for said counting-train, controlled by said finger.

9. The combination with a metallic drum, of means for passing cards over said drum, two contact-fingers normally engaging said drum but adapted to be raised therefrom by a card passing under said fingers, each card having holes therein through which said fingers are adapted to fall into contact with the drum, a counting-train, a friction driving mechanism therefor adapted to advance said train when free in a definite ratio to the movement of a card, a locking-magnet and a releasing-magnet, corresponding mechanism governing the advance of said counting-train, and circuits for said magnets controlled by said contact-fingers, substantially as described.

10. The combination with a record having holes therein at different longitudinal points, said holes being laterally offset with reference to each other, of two fingers arranged side by side and adapted to be engaged by said holes respectively, means for causing relative longitudinal movement of said record with respect to said fingers, a counting-train, means controlled by one finger in response to the first hole in said card for advancing said counting-train proportionately to the advance of said record, and means controlled by the other finger in response to the second hole in said card for arresting said counting-train; whereby the distance between said holes is mechanically integrated.

11. The combination with a record having two marks thereon indicating quantity by their distance apart, of an integrating-machine adapted to receive said record and having mechanism sensitive to the marks thereon for integrating the distance between said marks, numbers-type, and means for setting the same controlled by said integrating mechanism, a result-record, and means for printing said result-record with the numbers-type so set.

12. The combination with a counting-train having numbers-type, of a result-record, means for impressing said type upon said result-record to print the number indicated by said counting-train, a card having marks thereon, means for moving said card, friction driving mechanism adapted to advance said counting-train proportionately to the movement of said card, a normally-operative lock for said counting-train, and means for releasing said counting-train governed by said marks.

13. The combination with a counting-train, of a record having terminal marks indicating quantity by their longitudinal distance apart, of means for moving said record, and mechanism made operative by the passage of the intermediate portion of said record which lies between said terminal marks, for correspondingly advancing said counting-train; whereby the longitudinal distance between said marks is integrated.

14. The combination with two drums and an endless belt passing around said drums, of record-cards adapted to be fed upon the the lower laps of said belt and to be carried thereby around one of said drums, a tray arranged to receive the cards from said last-mentioned drum, integrating mechanism controlled by the cards in their passage, a type-wheel adapted to be set by said integrating mechanism, and a result-record adapted to receive impressions from said type-wheel.

In witness whereof I hereunto subscribe my name this 25th day of October, A. D. 1905.

PHILIP J. DARLINGTON.

Witnesses:
WINFIELD W. LEACH,
DE WITT C. TANNER.